(12) United States Patent
Zhang et al.

(10) Patent No.: US 9,696,873 B2
(45) Date of Patent: Jul. 4, 2017

(54) SYSTEM AND METHOD FOR PROCESSING SLIDING OPERATIONS ON PORTABLE TERMINAL DEVICES

(71) Applicants: Kan Zhang, Shanghai (CN); Jialiang Wang, Shanghai (CN); Jingshen Wu, Shanghai (CN); Meng Zhang, Shanghai (CN)

(72) Inventors: Kan Zhang, Shanghai (CN); Jialiang Wang, Shanghai (CN); Jingshen Wu, Shanghai (CN); Meng Zhang, Shanghai (CN)

(73) Assignee: SHANGHAI CHULE (COO TEK) INFORMATION TECHNOLOGY CO. LTD., Shanghai (CN)

( * ) Notice: Subject to any disclaimer, the term of this patent is extended or adjusted under 35 U.S.C. 154(b) by 174 days.

(21) Appl. No.: 13/940,901

(22) Filed: Jul. 12, 2013

(65) Prior Publication Data
US 2014/0019912 A1    Jan. 16, 2014

(30) Foreign Application Priority Data

Jul. 13, 2012 (CN) .......................... 2012 1 0244788

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/023* (2013.01); *G06F 3/04883* (2013.01);
(Continued)

(58) Field of Classification Search
None
See application file for complete search history.

(56) References Cited

U.S. PATENT DOCUMENTS 4,718,102 A * 1/1988 Crane et al. ................... 382/185
5,850,488 A * 12/1998 Asai et al. ...................... 358/1.2
(Continued)

OTHER PUBLICATIONS

Yang Li "Gesture Search: A Tool for Fast Mobile Data Access" Oct. 3-6, 2010.*
Doodle Dial app for iPhone, 2010.*

*Primary Examiner* — Jennifer To
*Assistant Examiner* — Beau Spratt
(74) *Attorney, Agent, or Firm* — Finnegan, Henderson, Farabow, Garrett & Dunner, L.L.P.

(57) ABSTRACT

The invention relates to a system for processing sliding operations on a portable terminal device. The portable terminal device includes a touch screen. The system includes a memory device configured to store data related to sliding operations, and a processor coupled to the memory device. The processor is configured to cause to display, on the touch screen, a communication function interface for receiving user sliding operations. The processor is further configured to receive original messages obtained on the touch screen corresponding to the user sliding operations, and process the original messages to determine possible sliding patterns corresponding to the user sliding operations. The processor is also configured to set a user-defined sliding pattern based on the possible sliding patterns.

37 Claims, 7 Drawing Sheets

(51) Int. Cl.
   *G06F 3/023* (2006.01)
   *G06F 3/0488* (2013.01)
   *H04M 1/725* (2006.01)

(52) U.S. Cl.
   CPC .... *H04M 1/72519* (2013.01); *H04M 1/72552* (2013.01); *H04M 2250/22* (2013.01)

(56) References Cited

U.S. PATENT DOCUMENTS

| | | | |
|---|---|---|---|
| 5,864,635 A * | 1/1999 | Zetts et al. | 382/187 |
| 9,021,402 B1 * | 4/2015 | Li | G06F 3/0416 715/863 |
| 2006/0050962 A1 * | 3/2006 | Geiger et al. | 382/186 |
| 2009/0251420 A1 * | 10/2009 | Do | G06F 3/04883 345/173 |
| 2010/0073329 A1 * | 3/2010 | Raman et al. | 345/177 |
| 2010/0173668 A1 * | 7/2010 | Marui | G06F 1/1626 455/556.1 |
| 2011/0066984 A1 * | 3/2011 | Li | 715/863 |
| 2011/0141027 A1 * | 6/2011 | Ghassabian | G06F 3/0237 345/168 |
| 2011/0231796 A1 * | 9/2011 | Vigil | 715/810 |
| 2011/0279384 A1 * | 11/2011 | Miller et al. | 345/173 |
| 2012/0007713 A1 * | 1/2012 | Nasiri | A63F 13/06 340/5.81 |
| 2012/0044174 A1 * | 2/2012 | Kim | G06F 3/016 345/173 |
| 2012/0204155 A1 * | 8/2012 | Ben-Artzi et al. | 717/125 |
| 2013/0103672 A1 * | 4/2013 | Parikh et al. | 707/717 |
| 2013/0117768 A1 * | 5/2013 | Gheorghe et al. | 719/328 |
| 2013/0257781 A1 * | 10/2013 | Phulwani | G06F 3/044 345/173 |
| 2013/0326583 A1 * | 12/2013 | Freihold | G06F 3/04815 726/3 |

\* cited by examiner

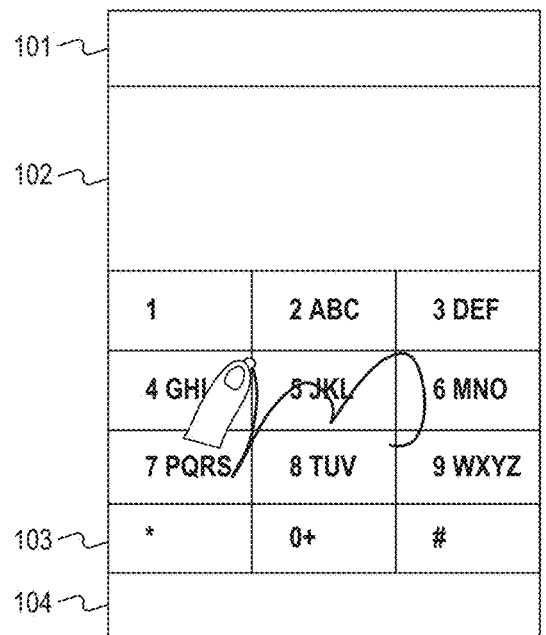
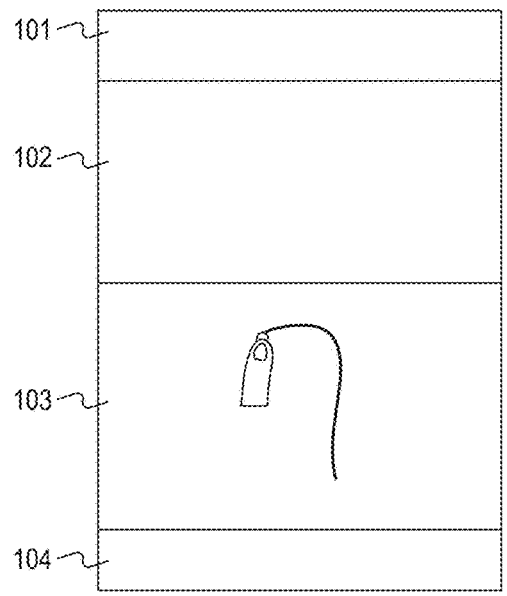
FIG. 4          FIG. 5
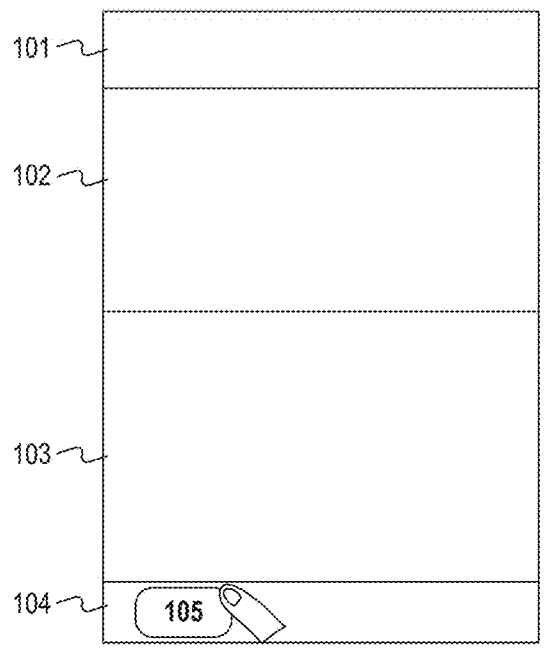
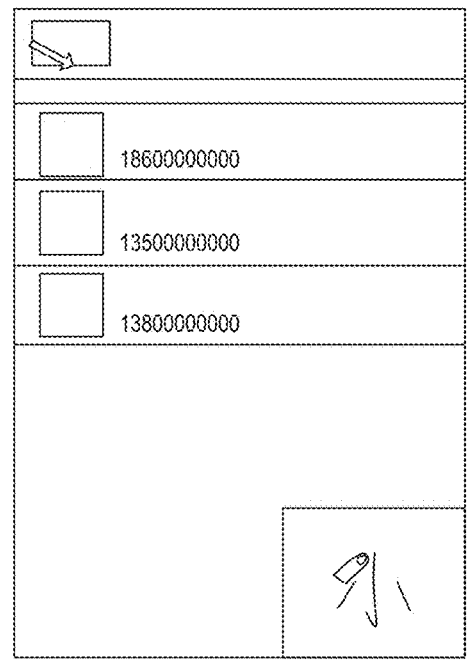
FIG. 6          FIG. 7

SYSTEM AND METHOD FOR PROCESSING SLIDING OPERATIONS ON PORTABLE TERMINAL DEVICES

CROSS REFERENCE OF RELATED APPLICATIONS

This application claims benefit to Chinese Application No. 201210244788.1, filed Jul. 13, 2012, which is incorporated by reference in its entirety as part of this application.

TECHNICAL FIELD

The invention relates to information input and information control for portable electronic devices, and more specifically relates to systems and methods for enabling sliding operations to assist information input control on portable terminal devices.

BACKGROUND

Conventional mobile communication input control software used on portable devices is tedious and complex in terms of operations such as dialing and searching for contacts. In most situations, when a user wants to make a call, she normally needs to input the whole telephone number in order to identify a contact, or complete tedious operations to search for the contact and switch back and forth between pages in order to complete dialing. Accordingly, dialing efficiency for users is relatively low.

A few improvements have been proposed to address the above issue. For example, faster dialing may be realized by associating digital numbers on user-defined dial pad with corresponding telephone numbers. However, only a limited number of contacts can be identified in this way, and association between the dial pad numbers and the telephone numbers is difficult to remember. For another example, a favorite contacts function may facilitate the search of contacts, but still cannot achieve convenient contact management and search. Another example is voice dialing. Although it saves the operations of inputting and tapping by a user, the voice search is usually time-consuming and sometimes requires the existence of the internet, and voice identification is relatively low quality. In summary, a more accurate, faster, more usable system and method for assisting the information input by sliding-operation are desired.

SUMMARY

The invention provides systems and methods for enabling sliding operation that replaces the traditional dialing, and provides information input control function on portable terminal devices, which are simple, efficient, reliable and can be widely used, so as to rapidly complete complex operations on the portable device, and simplify the usage steps of users.

In order to realize the above object, systems and methods for processing sliding operation on portable terminal devices are disclosed. In one aspect, a system for processing sliding operations on a portable terminal device is disclosed. The portable terminal device includes a touch screen. The system includes a memory device configured to store data related to sliding operations, and a processor coupled to the memory device. The processor is configured to cause to display, on the touch screen, a communication function interface for receiving user sliding operations. The processor is further configured to receive original messages obtained on the touch screen corresponding to the user sliding operations, and process the original messages to determine possible sliding patterns corresponding to the user sliding operations. The processor is also configured to set a user-defined sliding pattern based on the possible sliding patterns.

In another aspect, a computer-implemented method for processing sliding operations on a portable terminal device is disclosed. The portable terminal device includes a touch screen. The method includes storing data related to sliding operations. The method further includes displaying, on the touch screen, a communication function interface for receiving user sliding operations, and receiving, by a processor, original messages obtained on the touch screen corresponding to the user sliding operations. The method also includes processing, by the processor, the original messages to determine possible sliding patterns corresponding to the user sliding operations, and setting a user-defined sliding pattern based on the possible sliding patterns.

Since these systems and methods replace complex operations such as traditional dialing and searching for the contact by simple sliding operations based on contact list software, operations such as dialing and searching for contacts can be rapidly realized. Therefore, they do not only simplify the tedious usage steps of users commonly used in the contact list software, but also simplify usage steps of users so as to bring great convenience to users. In addition, they are simple and efficient, reliable in operation performance and can be widely used, so as to supply a solid foundation for further large-scale popularization and application of the portable terminal device.

BRIEF DESCRIPTION OF THE DRAWINGS

Exemplary non-limiting embodiments of the invention are described below with reference to the attached figures. The drawings are illustrative and generally not to an exact scale. The same or similar elements on different figures are referenced using the same reference numbers.

FIG. 4 illustrates an exemplary interface provided on a portable terminal device for receiving sliding inputs, consistent with some disclosed embodiments;

FIG. 5 illustrates an exemplary sliding input on a sliding-input identification area on a portable terminal device, consistent with some disclosed embodiments;

FIG. 6 illustrates an exemplary sliding input starting from a designated area of the interface on a portable terminal device, consistent with some disclosed embodiments;

FIG. 7 illustrates exemplary contact screening results in response to a sliding input, consistent with some disclosed embodiments;

DETAILED DESCRIPTION OF THE EMBODIMENTS

For better understanding of the technical contents of the invention, following embodiments are described to explain.

First of all, sliding-operation identification will be introduced.

Assuming that a person uses one finger to draw some certain signs on a screen to represent a function required to operate, for example, drawing a circle represents making a call to someone. The design of sliding-input, or in other words sliding operation, itself fits habits of user's daily usage, won't bring users additional burden of remembering, and is easy to be accepted by the users. Meanwhile, user-defined commonly-used sliding-operations are supported so as to cope with certain events or actions. Additionally, the invention also supports multi-strokes sliding operations identification on the touch screen and complex sliding-operation, for example a complex sliding-operation including several sliding operations of various types.

The network storage module in the contact list of the invention provides network storing service, thus addressing a concern that resets need to be made after SIM card is changed or an install program is unloaded, and sliding settings and defined actions can be directly restored from the server side. A sliding database is established for storing data of sliding signs, including original predefined sliding-inputs, user-defined sliding-inputs, Chinese characters and strokes data.

(1) original predefined sliding-inputs: providing users with some operations commonly used during dialing, for example, directly dialing a telephone number of last call, rapidly creating new contacts. Those operations will follow user's usage principles. Some sliding patterns are predefined to correspond to those operations, and edit of the sliding patterns or the operations by users are supported.

(2) user-defined sliding-inputs: users are given one list of commonly-used operations, and users are allowed to define a complete sliding pattern information. For example, a telephone number of a certain contact can be directly dialed by one sliding-operation; and users are allowed to define contacts, telephone number, and sliding patterns. Supportable user-defined contents include directly sending a text message/Email to the telephone number of a certain contact, directly reviewing detailed information about someone. There also are operations combined with functions unique to the contact list, directly reviewing someone's SNS homepage, editing signature line, rapidly setting busy and idle states, and so on.

(3) Chinese character strokes data: when users start a stroke-searching-contact process, the database is compared based on the whole input Chinese character or some strokes, and then matched searching results are output.

Figure 1:
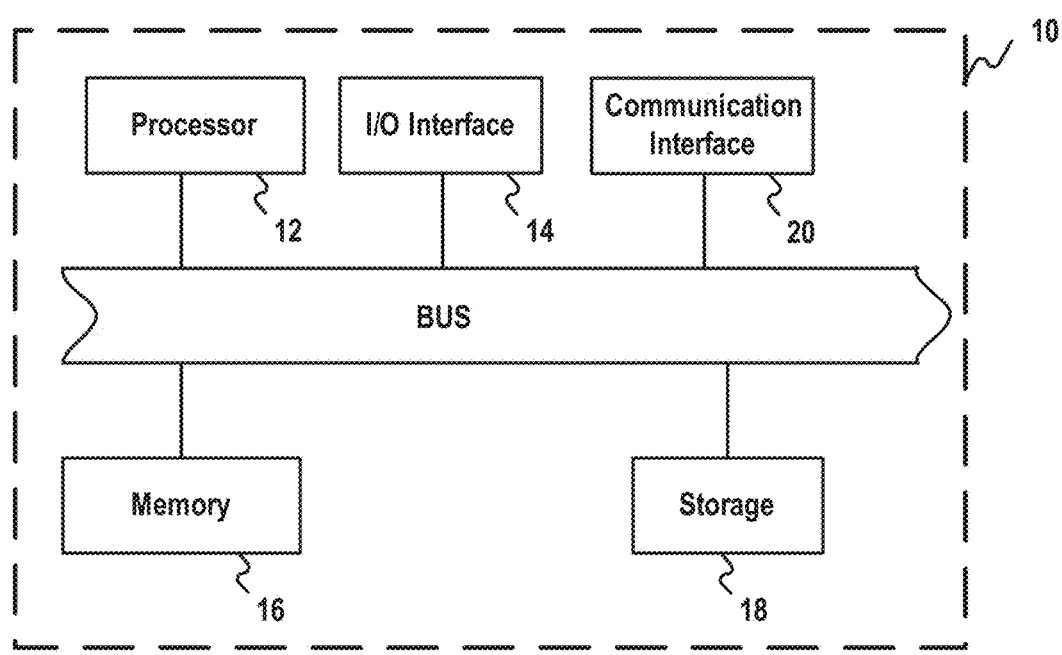
FIG. 1 is a schematic diagram illustrating an exemplary system for processing sliding operations on portable terminal devices, consistent with some disclosed embodiments.

Reference will now be made in detail to exemplary embodiments, examples of which are illustrated in the accompanying drawings. When appropriate, the same reference numbers are used throughout the drawings to refer to the same or like parts. FIG. 1 is a schematic diagram illustrating an exemplary system 10 for processing sliding operations on portable terminal devices.

As shown in FIG. 1, system 10 may include a processor 12, an I/O interface 14, a memory 16, a storage device 18, a communication interface 20, and a bus to facilitate information exchange among various components of system 10. Processor 12 may be a central processing unit ("CPU"), a graphic processing unit ("GPU"), or another suitable information processing device. Depending on the type of hardware being used, processor 12 can include one or more printed circuit boards, and/or one or more microprocessor chips. Processor 12 can execute sequences of computer program instructions to perform various methods that will be explained in greater detail below. I/O interface 14 may be configured to receive from and output data to the touch screen of the portable terminal device.

Memory 16 can include, among other things, a random access memory ("RAM") and a read-only memory ("ROM"). Computer program instructions can be stored, accessed, and read from memory 16 for execution by processor 12. For example, memory 16 may store one or more software applications. Further, memory 16 may store an entire software application or only a part of a software application that is executable by processor 12.

In some embodiments, storage device 18 may be provided to store a large amount of data, such as databases containing data of sliding signs, including original predefined sliding-inputs, user-defined sliding-inputs, Chinese characters and strokes data, etc. Storage device 18 may also store software applications that are executable by one or more processor 12. Storage device 18 may include one or more magnetic storage media such as hard drive disks; one or more optical storage media such as computer disks (CDs), CD-Rs, CD±RWs, DVDs, DVD±Rs, DVD±RWs, HD-DVDs, BLU-RAY DVDs; one or more semiconductor storage media such as flash drives, SD cards, memory sticks; or any other suitable computer readable media.

Figure 2:
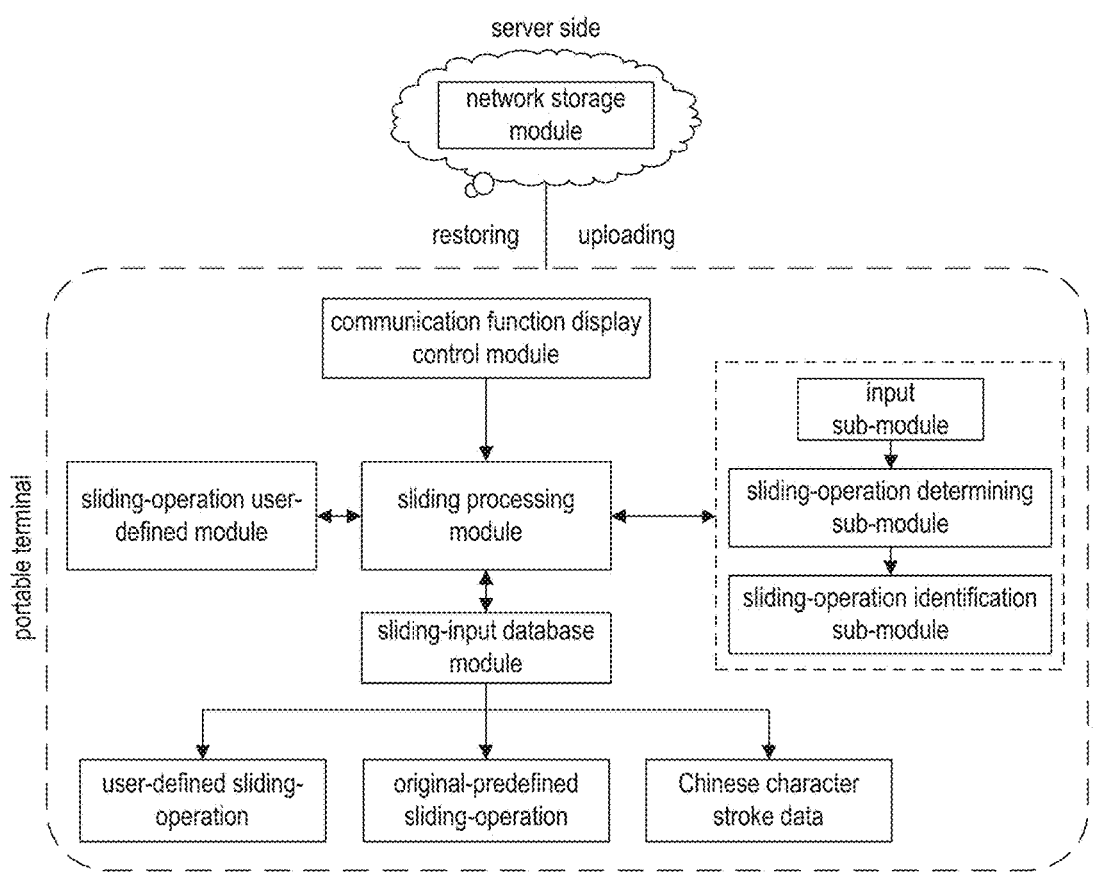
FIG. 2 is a block diagram showing various functional modules of an exemplary system for processing sliding operations on a portable terminal device, consistent with some disclosed embodiments.
Figure 3:
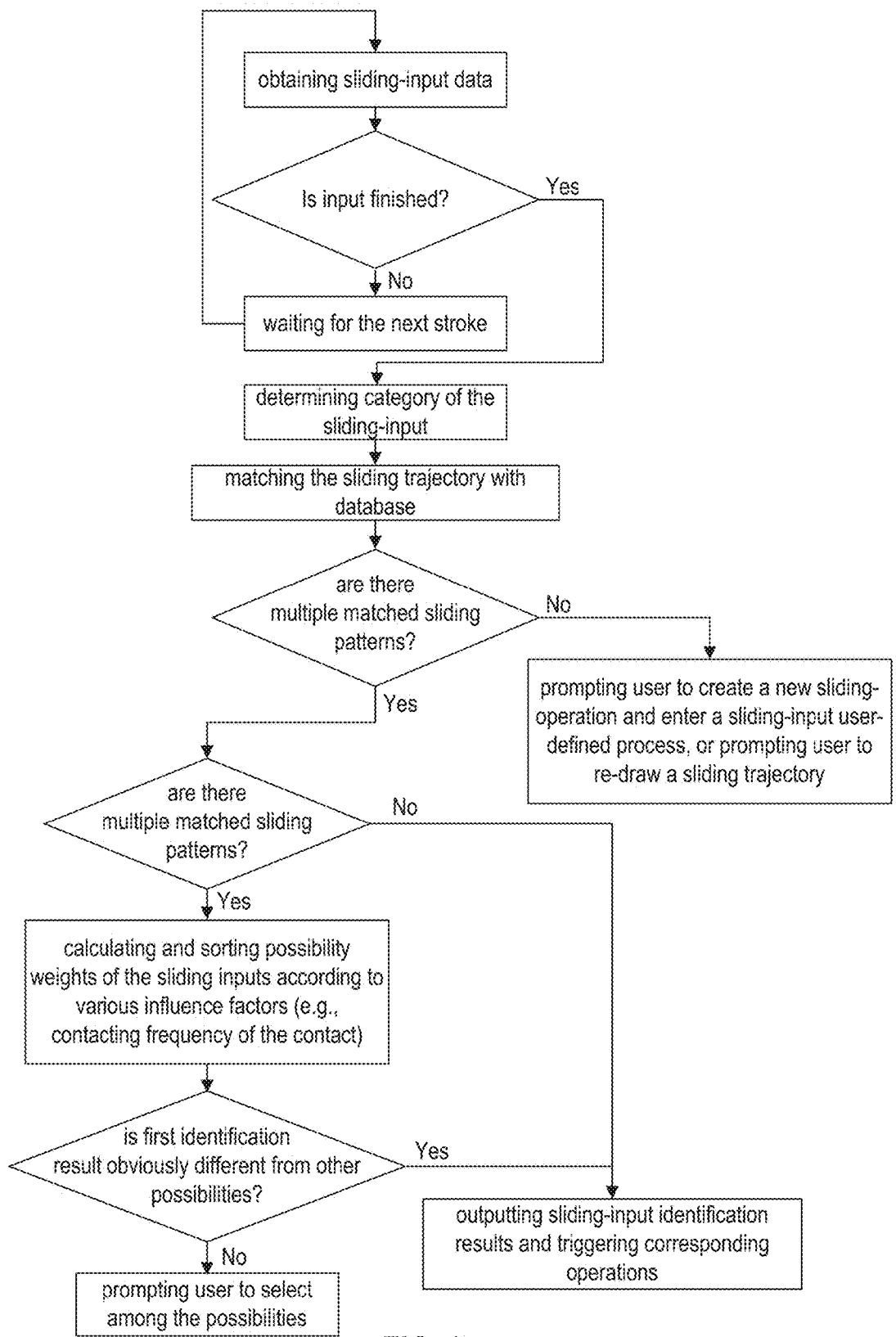
FIG. 3 is a flow chart of an exemplary method for processing sliding operations on a portable terminal device, consistent with some disclosed embodiments.

As shown in FIG. 2 and FIG. 3, system 100 may include various function modules for processing sliding operations on a portable terminal device, including:

(1) a communication function display control module, for displaying, on the touch screen of the portable terminal device, a communication function interface for users to operate. The communication function display control module may be a contact list display control module, and the communication function interface may correspondingly be a contact list interface; the communication function display control module may also be a dial pad display control module, and the communication function interface may correspondingly be a dial pad;

(2) a sliding-input database module, for storing data related to sliding-operation. the stored data related to sliding-operation includes original-predefined sliding-inputs, user-defined sliding-inputs, and letters, numbers, strokes, handwritten characters;

(3) sliding processing module, connected to the sliding-input database module, for receiving user's operations on the communication function interface, processing original messages obtained on the touch screen, and determining and finding out possible sliding patterns by loading the sliding-input database module; and following sub-modules may be included:

(A) an input sub-module, for receiving the original message according to user's actions, and transferring original messages obtained on the touch screen to a sliding-operation determining sub-module. The original messages are actions of user's fingers, for example, pressing, lifting, dragging, and moving etc. In the case of sliding, the original messages include sliding patterns drawn by the user.

transferring the original messages obtained on the touch screen to the sliding-operation determining sub-module is specifically as follows:

sliding patterns inputted by the users' actions on a sliding recognizable area of the touch screen are transformed into relative coordinates, which are then transferred to the sliding-operation determining sub-module. The sliding recognizable area is the dial pad of the touch screen or the corresponding interface in contact list of the portable terminal device;

(B) a sliding-operation determining sub-module, for receiving the original messages from the input sub-module, and processing the original messages. The sliding-operation determining sub-module processes the original messages, and specifically operates as follows:

the sliding-operation determining sub-module performs one or more of following three kinds of sliding-determining mode process operations:

(a) a direct sliding-input on dial pad mode determining process operation, in this mode, the sliding-operation determining sub-module performs determining process based on sliding patterns directly drawn on the dial pad of the touch screen by the user, and determines whether user's action is a tap or a sliding-input;

(b) an independent sliding identification mode determining process operation, in this mode, the sliding-operation determining sub-module performs determining process based on sliding patterns drawn on a drawing area by the user;

(c) a special starting area identification mode determining process operation, in this mode, the sliding-operation determining sub-module identifies all sliding actions of the users starting from areas designated by the system as sliding-operations, and performs determining process.

Categories of the original messages includes:

(a) a static action, corresponding to a point on the touch screen; the static action may be any of following:

(i) a single-tap, where the finger lifts immediately after pressing on the touch screen;

(ii) a short-time pressing, where the finger lifts within a short period predetermined by the system after pressing on the touch screen;

(iii) a long-time pressing, where the finger neither lifts nor moves within a long period predetermined by the system after pressing on the touch screen;

(b) a dynamic sliding action, corresponding to a sliding patterns on the touch screen; the dynamic sliding pattern may be any of following cases:

(i) a sliding movement, the finger moves and then lifts after pressing on the touch screen;

(ii) multiple sliding movements, the finger moves several times on the touch screen within a specified time interval;

(iii) a multi-fingers sliding movement, multiple fingers simultaneously produce a plurality of trajectories on the touch screen, and the multiple fingers means two fingers or more fingers.

(C) a sliding-operation identification module, respectively connected to the sliding-input database module and the sliding-operation determining sub-module, for determining and finding out possible sliding patterns by loading the sliding-input database module;

Moreover, the sliding processing module can determine separation and combination of functional sub-module in any other feasible ways, and corresponding technical solutions and embodiments do not depart from basic ideas of the invention, and belong to protection scope of the invention.

(4) a sliding-operation user-defined module, for configuring user-defined sliding-input actions according to user's operation;

(5) a network storage module, which based on interaction relationship between a contact list establishing network and the portable terminal device, uploads configuration information of the sliding-operation user-defined module set by the users and information in the sliding-input database module to a server for backup; the network storage module is deployed at network cloud.

Referring to FIG. 3 again, as for the method for processing sliding operations on a portable terminal device system, predetermined conditions of the method are as follows:

the communication function interface for users to operate is displayed on the touch screen of the portable terminal device;

the method further comprises sliding-determining process and sliding-identification process, and the sliding-determining process specifically operates as follows:

the sliding processing module performs one or more of following three kinds of sliding-determining mode process operations:

(11) direct sliding-input on dial pad mode determining process operation, in this mode, the sliding-operation determining sub-module performs determining process based on sliding patterns directly drawn on the dial pad of the touch screen by the user; the direct sliding-input on dial pad mode determining process operation comprises the following steps:

(a) sliding processing module determines whether user's action is a tap or a sliding-input by using the original messages based on one or more of the following rules:

(i) when a linear distance between a start point and an end point of the sliding of the user's action exceeds a distance threshold predetermined by the system, the user's action is determined as a sliding-input;

(ii) when a length of the sliding pattern of user's action exceeds a length threshold predetermined by the system, the user's action is determined as a sliding-input;

(iii) when a time period for which the finger contacts the touch screen during user's action exceeds a time threshold predetermined by the system, the user's action is determined as a sliding-input;

(iv) when the sliding pattern of user's action intersects with a boundary line of two keys on the dial pad, or the sliding of user's action appears in two key areas at one time, or the sliding pattern of user's action covers at least two key areas, the user's action is determined as a sliding-input;

(v) when two or more touch points are simultaneously pressed in the user's action, the user's action is determined as a sliding-input;

(b) if the user's action fails to satisfy one or more of the above rules (i) to (v), the user's action is determined as other ordinary operations; those ordinary operations, process the numbers or the letters obtained by the use's action by appending the numbers to a dialing sequence in order to make a call or appending the letters to a search sequence in order to obtain the contacts containing the letters.

(12) independent sliding identification mode determining process operation, in this mode, the sliding-operation determining sub-module performs determining process based on sliding patterns drawn on a drawing area by the user; the independent sliding identification mode determining process operation comprises the steps of: (a) the sliding processing module enters into the sliding-determining mode according to predetermined operations of the users; and (b) the sliding processing module determines all of the user's action, except for specific operations predetermined by the system, as sliding-inputs.

These predetermined operations of the users may be one or more of following: (a) the user taps a button on the touch screen; (b) the user sends a voice command to the portable terminal device; (c) the user shakes the portable terminal device; (d) the user presses a hardware button of the portable terminal device; (e) the user sends an instruction to the portable terminal device through other input devices; and (f) the user draws a sliding-pattern with a specific shape.

The specific operations predetermined by the system, so as to exit the sliding-determining mode, include tapping an exit button by the user; or inputting an exit command to the portable terminal device through voice or other input devices; or pressing a specific functional button; or performing a specific motion while holding the portable terminal device, for example, turning the portable terminal device over.

(13) Special starting area identification mode determining process operation, in this mode, the sliding-operation determining sub-module identifies all sliding operations of the users starting from areas designated by the system as sliding-operations, and performs determining process.

The special starting area identification mode determining process operation comprises the following steps: (a) the sliding processing module acquires user's action of pressing the touch point in areas designated by the system; (b) the sliding processing module determines all sliding-operations starting from a position of pressing the touch point until a lifting action, as sliding-inputs.

The sliding-identification process may comprise the following steps: (21) the sliding processing module analyzes the received sliding patterns data, for example the relative coordinates according to the original messages; (22) the sliding processing module determines whether the sliding-input data is a single-stroke input or a multi-strokes input; (23) the sliding processing module makes a comparison analysis with the sliding-input database module so as to obtain corresponding sliding-operation categories.

The categories may include: (a) numbers; (b) letters; (c) strokes; (d) Chinese characters; and (e) handwritten characters of other languages. For example, handwritten characters of other languages may be Japanese characters, Korean characters, Thai characters, Arabic characters, Hebrew characters, or minority language characters. The categories may also include (f) system-predefined or user-defined sliding-operations.

The sliding-identification process may further comprise the following steps: (24) the sliding processing module performs matching with respect to the defined sliding pattern in the sliding-input database module; (25) if one or more matched sliding-operations match, then it continues to step (27); (26) if nothing matches, then the user is prompted to make sure whether new sliding-operation need to be set or sliding need to be re-entered, and the process terminates; (27) the sliding processing module outputs sliding-identification results and triggers corresponding following operations, which comprises the following steps: (a) if the sliding-identification result is a number, the number is added into a dialing sequence of the portable terminal device; (b) if the sliding-identification result is a letter, the letter is added into a search sequence of the portable terminal device, and all of the contact information including the letter is returned; (c) if the sliding-identification result is a stroke, the stroke is added into a search sequence of the portable terminal device, and all of the contact information sequentially including the stroke is returned; and (d) if the sliding-identification result is a Chinese character or a handwritten character of other languages, the Chinese character or the handwritten character of other languages is added into a search sequence of the portable terminal device, and all of the contact information sequentially including the Chinese characters or handwritten characters of other languages is returned.

In some embodiments, the following steps may be performed before step (27): (27a) the sliding processing module calculates and sorts possibility weights of the sliding according to system-predetermined influence factors; the influence factors include contacting frequency of the contact.

Calculating possibility weights of sliding-operation include matching similarity of corresponding sliding pattern and the system-predetermined influence factors are weighted and calculated, so as to the possibility weight of the sliding-operation;

(27b) if difference between possibility weight of a sliding-input with largest possibility weight and possibility weight of any other sliding-input in the sorting result exceeds a system-predetermined weight difference threshold, the sliding-input with largest possibility weight is directly selected as the sliding-identification result; or, all the sliding-inputs in the sorting result are shown as the sliding-identification results for the user to select.

In some embodiments, the method for processing sliding-operations on the portable terminal devices further comprises user-defined sliding-input process operation, and may comprise the following steps:

(31) the sliding-operation user-defined module performs a sliding-defined setting process according to user's operation, which may include the following steps: (a) the sliding-operation user-defined module prompts users to draw desired sliding pattern; (b) the sliding-operation user-defined module compares the sliding pattern drawn on the touch screen by the user and existing sliding patterns in the system; (c) if similarity of those two exceeds a system-predetermined similarity threshold, similar sliding-operations are shown to the user, and the user is prompted to re-draw a sliding pattern; and (d) otherwise, sliding information drawn by the user is stored;

Alternatively, it may comprise the following steps: (a) the sliding-operation user-defined module reads out blank user-defined sliding information predetermined in the system; (b) the sliding-operation user-defined module shows corresponding blank user-defined sliding information to the user, and prompts the user to select; and (c) the sliding-operation user-defined module stores corresponding blank user-defined sliding information according to selection of the user.

(32) the sliding-operation user-defined module performs an operation-defined setting process triggered by corresponding sliding according to user's operation. Operations triggered by sliding include: (a) operations related to the contact, such as: (i) making a call, which is making a call to the contact designated by the user; (ii) texting, which is sending a text message to the contact designated by the user; (iii) emailing, which is sending an email to the contact designated by the user; and (iv) instant messaging, which is sending an instant message to the contact designated by the user via network; (v) visiting a SNS homepage of the contact designated by the user.

Operations triggered by sliding further include (b) commonly-used operations of the portable terminal device.

The user-defined sliding-input process operations may also comprise the following steps: (31) the sliding-operation user-defined module performs the operation-defined setting process corresponding to the sliding-operation according to user's operation. Operations corresponding to the sliding comprise: (a) operations related to a contact, including (i) making a call, which is making a call to the contact designated by the user; (ii) texting, which is sending a text message to the contact designated by the user; (iii) emailing, which is sending an email to the contact designated by the user; and (iv) instant messaging, which is sending an instant message to the contact designated by the user via network; (v) visiting a SNS homepage of the contact designated by the user.

Operations corresponding to the sliding may further comprise (b) commonly-used operations of the portable terminal device.

(32) The sliding-operation user-defined module performs the sliding-defined setting process required to trigger corresponding operation according to user's operation; the sliding-defined setting process required to trigger corresponding operation may comprise the following steps: (a) the sliding-operation user-defined module prompts users to draw sliding pattern required to trigger corresponding operation; (b) the sliding-operation user-defined module compares the sliding pattern drawn on the touch screen by the user and existing sliding patterns in the system; (c) if similarity of those two exceeds a system-predetermined similarity threshold, similar sliding patterns are shown to the user, and the user is prompted to re-draw a sliding pattern; and (d) otherwise, sliding information drawn by the user is stored, and correspondence relationship between such sliding information and corresponding operation is established.

Alternatively, it may comprise the following steps: (a) the sliding-operation user-defined module reads out blank user-defined sliding information predetermined in the system; (b) the sliding-operation user-defined module shows corresponding blank user-defined sliding information to the user, and prompts the user to select; (c) the sliding-operation user-defined module establishes correspondence relationship between such the blank user-defined sliding information and corresponding operation according to selection of the user.

The exemplary system 100 shown in FIG. 2 includes the following modules:

1. a communication function display control module, for displaying, on the touch screen of the portable terminal device, a communication function interface for users to operate. The communication function display control module may be a contact list display control module, and the communication function interface may correspondingly be a contact list interface; the communication function display control module may also be a dial pad display control module, and the communication function interface may correspondingly be a dial pad operation interface.

2. a sliding-operation user-defined module, which allows users to define desired sliding patterns with respect to various operations.

3. a sliding processing module, which in an embodiment of the invention, may include sub-modules: (1) input module, which is the access to the response to sliding-operation in contact list, and by means of user's operations on program, transfers the original messages obtained on touch screen to analysis-identification module on the downstream. Actions inputted by users on the sliding recognizable area are transformed into relative coordinates, which is then transferred to sliding-operation determining module for processing.

(a) the original messages: actions of user's fingers with respect to touch screen, including pressing, lifting, dragging, moving and the like.

(b) sliding recognizable area: the dial pad and a page for opening a certain function in contact list, for example, a page of contacts, where contacts are searchable directly through the inputted strokes by handwriting.

(2) a sliding-operation determining module, responsible for processing and analyzing the original messages after receiving information of the input module, and it supports the process of complex inputs such as multi-touch control. Whether it is a tap or a sliding-operation is determined by properties of the original messages and a system state. If it is a sliding pattern, it will be delivered into the sliding-operation identification module for further identification.

(3) a sliding-operation identification module, mainly used for finding out possible sliding patterns by loading the sliding-input database module; the sliding-input database module will feed back all of the sliding patterns similar to this sliding-operation, and sort all the results, for a instance, put the result with highest similarity at the beginning. A most likely result is outputted after a series of processes of the system.

4. a sliding-input database module, the module is used for storing data about sliding-operation, including original-predefined sliding-input, user-defined sliding-input, letters, numbers, strokes, handwritten characters, and so on.

In some embodiments, the exemplary system 100 further comprises 5. a network storage module, which uploads setting of the sliding-operation determining module set by the users and information in the sliding-input database module to a server for backup, based on interaction relationship established through a contact list between network and the portable terminal. If users change cellphones or unload software, data can simply be restored via network connection, and complex operation of resetting is avoided. The network storage module is optional.

It is contemplated that there are other ways to divide system 100 into different modules and sub-modules, which all fall into the protection scope of the invention; for sake of concision, they are not described here.

Referring to FIG. 4, which shows an interface structure of contact list system assisted by sliding-operation of the invention, which includes following portions:

top functional area 101, displaying attributes of current page, and so on;

main interface 102, including contact list, dialing functional area, and so on;

dial pad 103, i.e. sliding-operation interface;

bottom functional area 104, displaying information of the sliding-operations;

Processes performed by every module will be described in detail.

(I) User-Defined Sliding-Input

First of all, the system allows users to add user-defined sliding-operation for designated operations. When users activate user-defined sliding-input module (for example, tapping "add new sliding-operation" in a menu, and so on), a user-defined sliding-input flow starts. The user-defined sliding-input flow is described as follows:

1. defining sliding-operation: users are prompted to draw desired sliding patterns; according to settings of the system or the users, single stroke, multiple strokes, or multi-touch control may be supported. The sliding pattern drawn by users is compared with existing sliding patterns in the system. When similarity is high, similar sliding patterns will be displayed to users, and users are prompted to re-draw a sliding pattern.

2. defining operation: operations triggered by the sliding as selected by the users include but are not limited to: (1) operations related to the contact; including (a) making a call: making a call to the contact designated by the user; (b) texting: sending a text message to the contact designated by the user; (c) emailing: sending an email to the contact designated by the user; and (d) instant messaging: sending an instant message to the contact designated by the user via network; and (2) commonly-used operation, such as cleaning up call history and the like.

In step (1), besides drawing sliding patterns himself, the user may also choose one or more from predetermined sliding patterns.

In some embodiments, the order of above steps may be reversed, for example, users firstly define operations and then define sliding pattern. Besides user-defined sliding-operation, the system may also store some predetermined sliding patterns and operations.

(II) Sliding-Operation Determining Process:

The original messages of the input module include but are not limited to: (1) a static action, corresponding to a point on the touch screen, including (a) a single-tap, immediately triggered as being pressed; (b) a short-time pressing, lifting after a period of pressing; (c) a long-time pressing, neither lifting nor moving after pressing, and triggered after a period, and (2) dynamic sliding-operation, corresponding to a trajectory on the touch screen, including (a) a sliding movement, moving and then lifting after pressing; (b) multiple sliding movements, sliding several times within a specified time interval; (c) a two-finger (or multi-finger) sliding movement, simultaneously producing two (multiple) trajectories.

The sliding-operation determining module starts sliding-operation determination process after it receives the original messages of the input module. There are three kinds of different sliding-determining modes according to the embodiments of this invention. First is direct sliding-input on dial pad mode. In this mode, users can directly draw sliding patterns on the dial pad. Second is an independent sliding identification mode. In this mode, users can draw sliding patterns on a drawing area. Third is the special starting area identification mode. In this mode, all of the user's sliding-operations starting from areas designated by the system are identified as sliding-inputs.

1. direct sliding-input on dial pad mode

In this mode, users can input telephone number by directly tapping or sliding on the dial pad. The sliding-operation determining module will determine whether such action is a tap or a sliding-input by means of the original messages. It is determined whether such an action is a sliding-input by the following rules: (1) when a linear distance between a start point and an end point of the sliding exceeds a predetermined threshold, the action is determined as a sliding-input; (2) when a length of the sliding pattern of the sliding exceeds a predetermined threshold, the action is determined as a sliding-input; (3) when a time period for which the finger contacts the touch screen exceeds a predetermined threshold, the action is determined as a sliding-input; (4) when the sliding pattern intersects with a boundary line of two keys or appears in two key areas at one time, the action is determined as a sliding-input; and (5) when two or more touch points are pressed simultaneously, the action is determined as a sliding-input.

One or more of above rules for determining can be combined, so as to form various logics. When the action does not satisfy any rule for sliding-operation determining, it will be determined by the system as other ordinary operations, for example, operation of tapping a dialing key.

As shown in FIG. 5, which is an illustrative diagram of drawing sliding patterns directly on the dial pad 103, wherein sliding-input of number "7" may trigger corresponding function when a rule for determining sliding-operation actions is satisfied.

2. independent sliding identification mode

Users can start the sliding identification mode by some predetermined operations. In this mode, all operations will be determined as sliding-inputs, except for some specific operations. Predetermined operations for entering into the independent sliding identification mode comprises but is not limited to: tapping a button on the screen; sending a voice command; shaking the portable terminal device; pressing a hardware button; sending an instruction to the portable terminal device through other input devices; and drawing a sliding-pattern with a specific shape.

The specific operations include tapping a "withdraw" button so as to exit the independent sliding identification mode, or inputting an exit order to the portable terminal device through voice or other input devices; or pressing a specific functional button; or performing a specific motion while holding the portable terminal device, for example, turning the portable terminal device over; or otherwise exit operations.

As shown in FIG. 6, the independent sliding identification mode can be started by tapping a sliding-operation functional key 105 in bottom functional area 104 of a specific interface. The sliding-input can be performed on the sliding-input identification area.

3. the special starting area identification mode

In some interfaces on the portable terminal device, users can press a touch point in a specific area, then the resulting sliding will be determined as a sliding-input.

Figure 8:
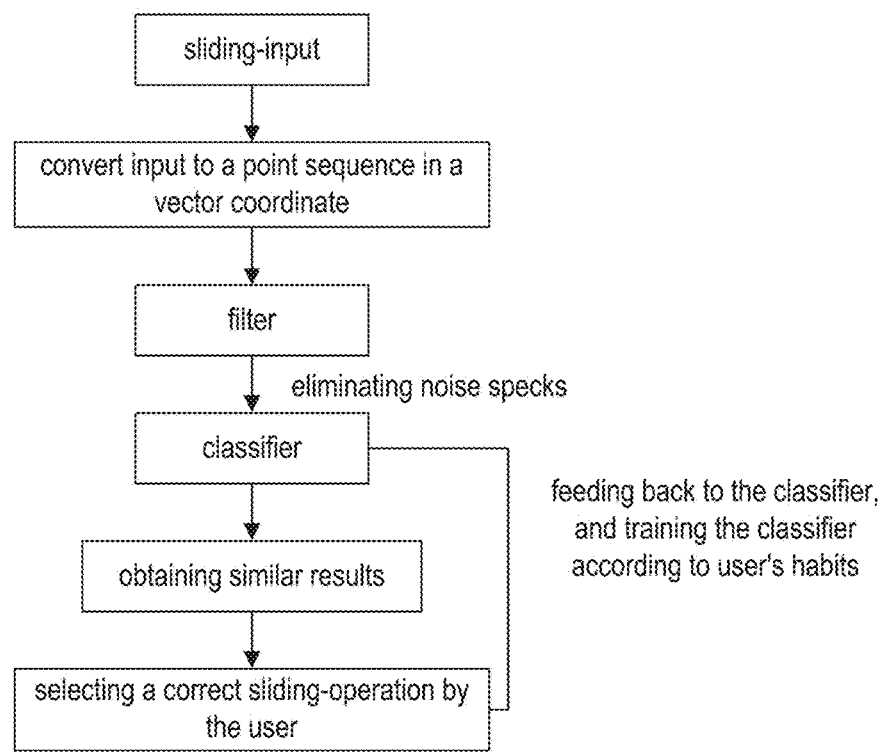
FIG. 8 is a flow chart of an exemplary method performed by a sliding operation classifier, consistent with some disclosed embodiments.

As shown in FIG. 7, in the contact list, sliding from a square at lower right of a screen, can be determined as a sliding-input. Referring to FIG. 8, for example, sliding-input of "丿" can trigger a search and display of a list of contacts including "丿" on the contact interface.

Those three kinds of identification modes above can be simultaneously started. For example, users can not only directly sliding-input on a dial pad, but also perform sliding-operations in a specific area.

If the user's action is determined as a sliding-operation, the process enters a sliding-input identification flow. Otherwise, the action can trigger other operations, for example, tapping on a number key on the dial pad will trigger the input of a number.

(III) Sliding-Input Identification Process

The sliding-identification process steps are:

(1) receiving and analyzing data of sliding delivered from the sliding-operation determining module;

(2) determining whether a sliding pattern is a single-stroke input or a multi-strokes input;

(3) making a comparison analysis so as to obtain sliding-operation categories: predefined sliding-input, user-defined sliding-input, numbers, letters, strokes, handwritten characters; recognizable sliding patterns include but are not limited to following categories:

(a) numbers, for example, "1, 2, 3 . . . "

(b) letters, for example, "a, b, c . . . "

(c) strokes, for example, "一(横), 一(折), 丿(撇), 乀(捺)" and the like (d) Chinese characters, for example, "王, 张" and the like (e) other handwritten characters, for example, Japanese characters, Korean characters, Thai characters, and the like;

(f) predefined or user-defined sliding patterns, for example, "C ∨ ♡" and the like.

(4) matching with respect to the defined sliding pattern in the sliding-input database, if one or more matched sliding pattern are found, entering next step; otherwise, the user is prompted to make sure whether new sliding-operation need to be set, or a sliding pattern need to be re-entered;

(5) calculating and sorting possibility weights of the sliding inputs according to various influence factors (for example, contacting frequency of the contact, and so on);

The possibility weight of a sliding input not only depends on similarity of the sliding-input, but also depends on corresponding operation of the sliding-input or its operation objective. For example, possibility weight for a dialing operation of a commonly-used contact may be larger than that for a dialing operation of another not-commonly-used contact. Finally, the possibility weight of a sliding input may optionally be obtained by weighting the similarity of the sliding-input and other aspects of influence factors. In some embodiments, the possibility weight of sliding-input may entirely depend on similarity of the sliding-input.

(6) when difference between possibility of the first sliding-input in the sorting result and that of other sliding-inputs is large, sliding-input with largest possibility is directly selected as identification result; otherwise, a plurality of sliding-identification results are shown for users to select;

When one sliding-input of the user has a plurality of corresponding possible sliding trajectories, the system can prompt users to one of those sliding-operations. Such step is also optional. In some embodiments, the system can always select the most possible sliding-input as identification result.

(7) outputting the sliding-identification result and triggering corresponding operations.

When the identification result is an user-defined or predefined sliding-input, corresponding operations may be performed; when the identification result is a number, the number may be added into a dialing sequence; when the identification result is a letter, the letter may be added into a search sequence, and all of the contacts including the letter are returned; when the identification result is a stroke, the stroke may be added into a search sequence, and all of the contacts sequentially including the stroke are returned; when the identification result is a Chinese character or handwritten character of other languages, the Chinese character or handwritten character may be added into a search sequence, and all of the contacts sequentially including the Chinese character or handwritten character. Steps (6) and (7) may be optional.

Meanwhile, sliding-input identification algorithm applied by the system of the invention uses a SVM classifier to cope with the judgments of different sliding patterns, and classifies and identifies letters, numbers, handwritings and strokes, and so on. Data classifying means forming a classifier by training based on existing classified training data according to collected habits of user's sliding-input and setting; and then using the classifier to determine the categories of those un-classified data. As shown in FIG. 8, process steps of sliding-input classifier are as follows:

(1) the input module receives sliding-input signal of users, and converts it into a point sequence on a vector coordinate;

(2) a filter removes the noises and outputs a noise-free path, and transforms it into spatial coordinates to be delivered to the classifier;

(3) classifier obtains a sliding-input set of analysis-and-identification result;

(4) finally, it is delivered to the users so as to perform correct sliding-operation response; meanwhile, user data is fed back to the classifier, as a result the classifier is trained time to time.

Support Vector Machine is a method based on classification boundary, and its basic principle is (taking two-dimensional data as an example): if training data distributes at points on a two-dimensional plane, they focus on different regions according to their categories. Object of the sorting algorithm based on classification boundary is, by training, finding out a boundary among those categories (straight line—called as linear partition, curve line—called as non-linear partition). As for multi-dimensional data (for example, N-dimensional), they can be treated as points on N-dimensional space, while the classification boundary is a face in N-dimensional space, called as hyper plane (hyper plane is one dimension less than N-dimensional space). Linear classifier uses boundary of hyper plane type, and nonlinear classifier uses hyper curve plane.

Figure 9:
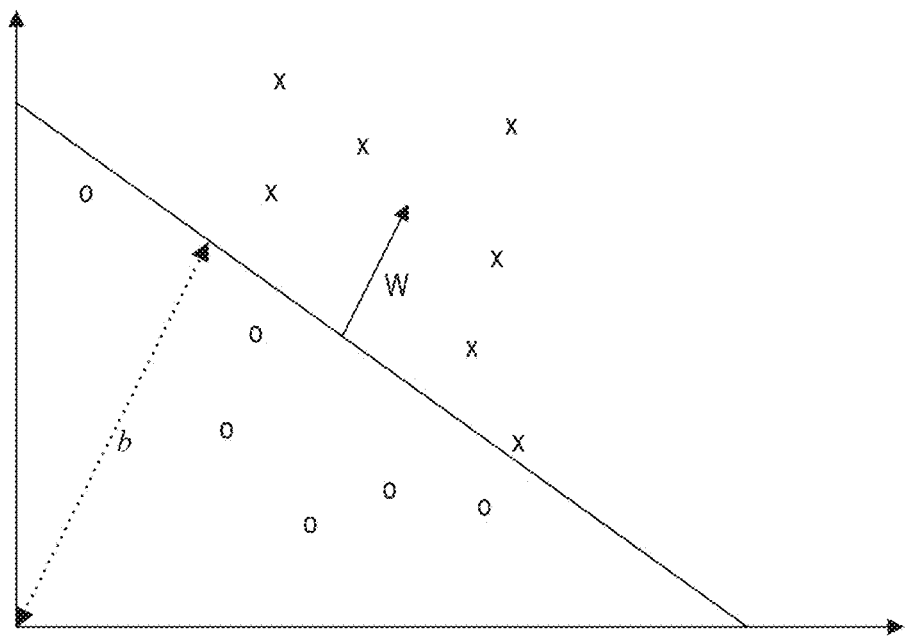
FIG. 9 illustrates a sliding pattern sorting algorithm, consistent with some disclosed embodiments.

As shown in FIG. 9, raw data can be divided by one straight line (if data is just two-dimensional) or one hyper plane. Linear support vector classifier:

Classifying face: (w·x)+b=0. Conditions are as follows:

$$\min_{\alpha} \frac{1}{2}\sum_{i=1}^{l}\sum_{j=1}^{l} y_i y_j \alpha_i \alpha_j (x_i \cdot x_j) - \sum_{j=1}^{l} \alpha_j,$$

$$\text{s.t.} \sum_{i=1}^{l} y_i \alpha_i = 0$$

$$\alpha_i \geq 0$$

after resolving accordingly (most optimal solution, and algorithm will be described later), then:

$$w^* = \sum_{i=1}^{l} y_i a_i^* x_i b^* = y_j - \sum_{i=1}^{l} y_i \alpha_i (x_i \cdot x_j)$$

where linear support vector machine is based on a largest interval method. The classification and optimization may be solved by quadratic programming. For example, the classification and optimization problem can be solved by using Lagrange function to joint-optimize problems and constraints, and then applying the duality theory.

Some sliding-operation definition embodiments of the invention are illustrated in the following.

1. original-predefined sliding-input: outputting corresponding sliding-operations according to statistics of actions most commonly used by the users in the contact list, and allowing the users to amend and edit according to its own usage habits.

For example: cleaning up all the inputted contents, directly dialing the last call, cleaning up all the call history, and so on.

| Operation | Original operation | Fast sliding operation |
|---|---|---|
| 1. cleaning up all the inputted contents | tapping deleting button for many times | |
| 2. voice dialing | long-time pressing of number "1" | V |
| 3. directly dialing the last call | reviewing call history →tapping the last call | L |
| 4. cleaning up all the call history | tapping "menu" →selecting "cleaning up all the call history" → prompt dialog box pops up for the user to confirm | C →prompt dialog box pops up for the user to confirm |
| 5. creating a new contact | inputting telephone number in dialing interface →tapping a button of creating a new contact → opening a contact editing program or: switching to contact interface →tapping a button of creating a new contact → opening a contact editing program | → directly opening a contact editing program |

Wherein, round dots represent start points.

Specific implementations are as follows:

(1) quickly cleaning up all the call history

The following steps may be performed: inputting a defined sliding pattern on the dial pad; pumping out user confirmation prompt dialog box of "cleaning up all the call history or not"; making confirmation to finish the operation.

sliding-input amending step: entering a sliding-input setting list page; selecting action of "cleaning up all the call history"; entering a sliding-input editing page; inputting a trajectory that can be associated with such sliding-operation (for example, " "); saving the sliding-input. The user-defined editing of sliding-operation is allowed, and multiple-strokes input is supported.

(2) directly dialing the first call in the call history page list

The following steps may be performed: the first call in the list can be directly dialed by inputting a defined sliding pattern "L" on the dial pad. With respect to nowadays smartphones with large screen, many users have difficulty in exactly tapping a position of the first line of the list, and a sliding distance of the finger is very large. Those problems can be solved conveniently by the fast sliding-operation.

Sliding-input amending step: entering a sliding-operation setting list page; selecting the operation of "directly dialing the first call in the call history page list"; entering a sliding-operation editing page; inputting a trajectory that can be associated with such sliding-operation (for example, "1"); saving. The user-defined editing of sliding pattern is allowed, and multiple-strokes input is supported.

(3) quickly creating a new contact

The following steps may be performed: inputting a defined sliding pattern of "+" on the dial pad, and calling a new contact creating program of the system.

Sliding-input amending step: entering a sliding-operation setting list page; selecting the operation of "quickly creating a new contact"; entering a sliding-operation editing page; inputting a trajectory that can be associated with such sliding-operation (for example, "N"); saving. The user-defined editing of sliding pattern is allowed, and multiple-strokes input is supported.

2. user-defined sliding-input: providing users with many more dialing actions for the users to edit the actions themselves. For example: directly dialing a certain contact's telephone number, directly sending a text message to a certain contact's telephone number, directly entering a certain contact's sns homepage, reviewing contacts in group, and so on.

Figure 10:
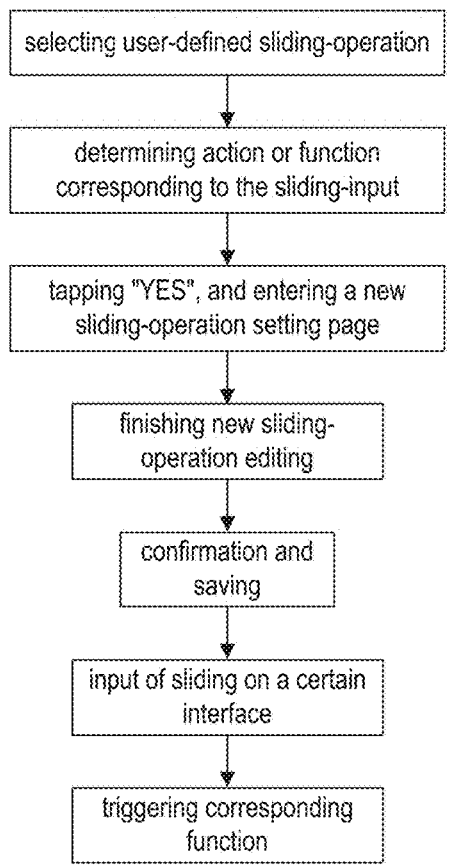
FIG. 10 is a flow chart of an exemplary user-defined sliding-input operation, consistent with some disclosed embodiments.

Specific steps of the user-defined sliding-input is illustrated in FIG. 10 as follows: selecting user-defined sliding-input; determining an action or a function corresponding to the sliding-input, entering a new sliding-operation setting page; finishing new sliding-operation editing and saving; inputting corresponding sliding pattern on a dial pad or contact interface; and triggering corresponding function.

Specific implementations are as follows:

(1) directly dialing a certain contact's telephone number conventional operation method includes steps as follows: searching for a contact; obtaining a search list; selecting a desired contact; selecting a telephone number; dialing.

Figure 11A:
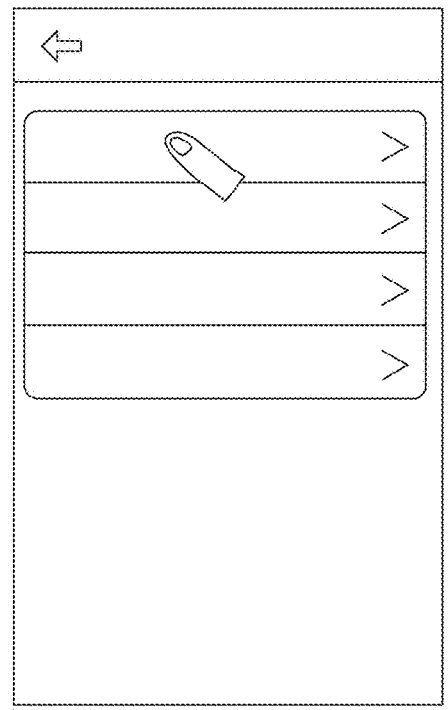
FIGS. 11A-11C are illustrative diagrams of operation procedures for realizing user-defined sliding-input dialing, consistent with some disclosed embodiments.
Figure 11B:
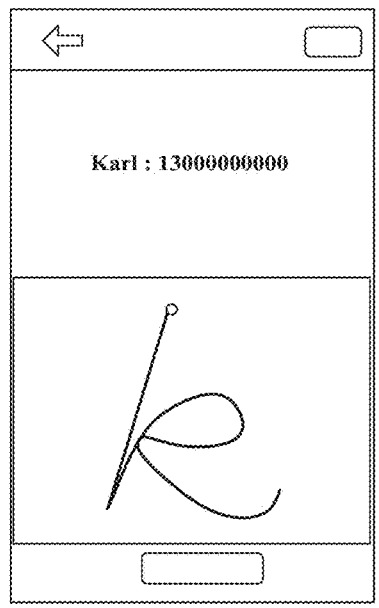
Figure 11C:
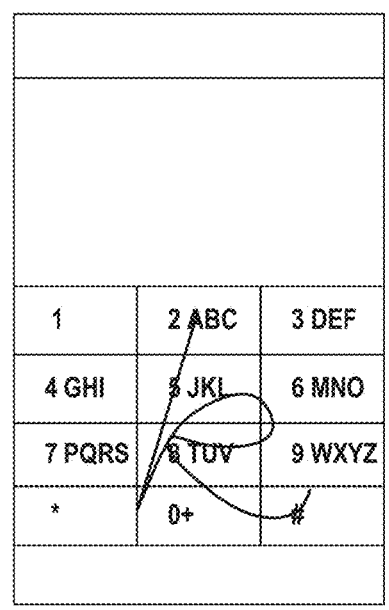

The sliding-operation steps of the invention are as follows:

(a) entering a new sliding-operation setting page, selecting a sliding pattern in order to dial a telephone number; as shown in FIG. 11A;

(b) selecting a telephone number or a contact to be associated, inputting a sliding pattern of corresponding function (for example " "), being associated with a telephone number of 13000000000, saving and then exiting; as shown in FIG. 11B;

(c) inputting a determined sliding pattern at a contact interface or a dialing interface; as shown in FIG. 11C;

(d) the analysis-identification module performs classification analysis with respect to the received sliding pattern, and eventually delivers the accurately matched results to the output module;

(e) directly launching a dialing program of the system.

(2) directly sending a text message to a certain contact's telephone number conventional operation method includes steps as follows: searching for contacts; obtaining a search list; selecting a desired contact; entering a detailed page to review; selecting a telephone number; editing a text message.

while the sliding-operation of the invention includes:

(a) entering a new sliding-operation setting page, selecting a sliding-operation in order to dial a telephone number;

(b) selecting a telephone number or a contact to be associated, inputting a sliding pattern of corresponding function (for example " "), being associated with a telephone number of 13000000000, saving and then exiting;

(c) inputting a set sliding pattern at a contact interface or a dialing interface;

(d) the analysis-identification module performs classification analysis with respect to the received sliding pattern, and eventually delivers the accurately matched results to the output module;

(e) directly activating a text message module, and entering a text message editing page.

(3) directly entering a certain contact's sns homepage the sliding-operation of the invention includes steps as follows:

(a) entering a new sliding-operation setting page, selecting a contact bonded with its own sns account in the contact list, for example, "W" represents an operation of directly opening San ZHANG's microblog;

(b) inputting a set sliding pattern at a contact interface or a dialing interface;

(c) the analysis-identification module performs classification analysis with respect to the received sliding pattern, and eventually delivers the accurately matched results to the output module;

(d) determining whether this current user is installed with a corresponding sns client program, and directly starting it if it is installed; or loading it via the page if it is not installed.

Figure 12:
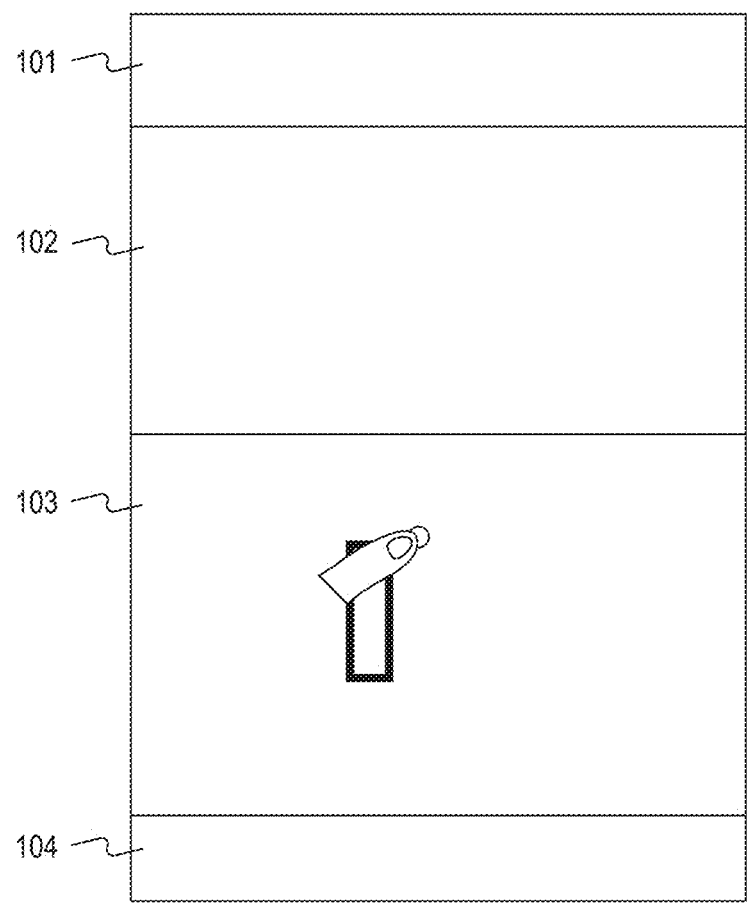
FIG. 12 is an illustrative diagram showing sliding-input of a Japanese character "え" in a sliding-input identification area, consistent with some disclosed embodiments.

(4) first letter sign of Chinese name or foreign language name of events, actions or commands is used as the sliding-operation of the command.

for example, "a" represents "all contact" (All) sliding pattern; "c" represents copy of contact, and so on;

As shown in FIG. 12, the sliding-input of Japanese character "え" may search for contact information beginning with that vowel.

(5) contact list fast synchronization includes copying the contact list of a SIM card into a cellphone, copying contacts of a cellphone into a SIM card, synchronization between email contacts and a cellphone/SIM card, and so on. Via the new sliding-operation setting page, sliding pattern of corresponding operations can be defined, so that above synchronization can be quickly finished.

(6) sliding-operation for contact grouping:

For example, round shapes represent family numbers, square shapes represent colleagues, triangles represent friends, and so on. A contact can be quickly found out and added at a contact interface or a dialing interface. Additionally, as for contact of some certain groups, some functions can be triggered by scaling with multiple fingers, for example, group-sending contacts to matched devices, backup at the network cloud, or updating contacts, and so on.

3. Chinese characters and strokes: when users try to quickly find out a contact by inputting strokes of a keyword of Chinese characters or contact information in the contact list, the inputted sliding pattern is compared and searched in the sliding-input database. For example: the user directly inputs "张" on the dial pad or contact searching page, then all the matched results including "张" among contact related words are obtained.

Specific implementations are as follows:

(1) Matched sliding patterns can be immediately found out after inputting of "ɤʔ". Meanwhile, if current user's SIM card belongs to China, a Chinese character or stroke with highest similarity (such as "∨⁄") will be returned; if the SIM card does not belong to China, a letter with highest similarity (for example, m) will be returned.

Preferably, if there exists a sliding-operation which is already set, a prompt dialog box pops up for the user to select the desired result; otherwise, only Chinese characters strokes or letters are returned.

(2) results including Chinese character of "张" among contact name information can be found out by inputting " 张 ".

(3) quick group-sending of message can be realized by means of combined operations of strokes together with sliding-input, steps of which are as follows:

(a) successively inputting "小王" and a sliding pattern of "∨⁄" at a contact interface or a dialing interface (b) the analysis-identification module performs classification analysis with respect to the received stroke and sliding pattern, and eventually delivers the accurately matched results to the output module;

(c) contact interface will firstly feedback results including "小王";

(d) secondly, corresponding functions of sliding-input are fed back, and an information sending interface is directly opened.

Since the above systems and methods for processing sliding operations on a portable terminal device replace complex operations such as traditional dialing and searching for the contact by simple sliding-operations based on contact list software, operations such as dialing and searching for contacts can be rapidly realized, thus not only tremendously simplifying the tedious usage steps of users commonly used in the contact list software, but also simplifying usage steps of users so as to bring great convenience to users; and they are simple and efficient, reliable in operation performance and can be widely used, so as to supply a solid foundation for further large-scale popularization and application of the portable terminal device. [0212] The embodiments of the present invention may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A system for processing sliding operations on a portable terminal device, the portable terminal device comprising a touchscreen, the system comprising:
    a memory device configured to store data related to sliding operations; and
    a processor coupled to the memory device, the processor being configured to:
        cause to display a dial pad or a contact list interface on the touchscreen;
        receive an original message obtained on the dial pad or the contact list interface;
        convert said original message to coordinates for processing;
        select a slide-determining mode from a plurality of slide-determining modes based on properties of said original message, wherein to select a slide-determining mode from a plurality of slide-determining modes is further based on a system state of the portable terminal device, wherein the portable terminal device further comprises a SIM card and wherein the system state of the portable terminal device includes a property of the SIM card;
        determine whether said original message is a sliding operation based on the selected slide-determining mode, wherein to determine whether said original message is a sliding operation, the processor is further configured to:

determine whether said original message is a sliding operation according to a category of said original message when the selected slide-determining mode is a direct sliding-input on a dial pad mode;

analyze said sliding operation and compare said sliding operation with the data related to sliding patterns stored in a sliding-input database, when said original message is determined as a sliding operation;

identify a result corresponding to said sliding operation according to the comparison;

output the result and trigger a follow-up corresponding operation;

append, if the result is a number, the number to a dialing sequence of the portable terminal device; and append, if the result is a stroke, the stroke to a search sequence of the portable terminal device, and returning contact information including the stroke sequence.

2. The system of claim 1, wherein to determine whether said original message is a sliding operation, the processor is further configured to perform one or more of the following processes:

determine said original message as a sliding operation in an independent sliding identification mode, if said original message is drawn in a drawing area between a first predetermined operation for entering the independent sliding identification mode and before a second predetermined operation for exiting the independent sliding identification mode; and determine said original message in a special starting area identification mode, from touching the screen to lifting from the screen, as a sliding operation, if the user's action starts from a designated area.

3. The system of claim 2, wherein to determine whether said original message is a sliding operation, the processor is further configured to determine, when said original message intersects with a boundary line between two keys on the dial pad, or appears in two key areas at one time, or the sliding pattern covers at least two key areas, said original message as a sliding operation.

4. The system of claim 2, wherein the first predetermined operation is one or more of following operations:

(1) tapping a button on the touch screen;
(2) sending a voice command to said portable terminal device;
(3) shaking said portable terminal device;
(4) pressing a hardware button of said portable terminal device;
(5) sending an instruction to the portable terminal device through other input devices; and
(6) drawing a sliding-pattern with a specific shape, and wherein the second predetermined operation is one or more of following operations:

(1) tapping an exit button;
(2) inputting an exit order to the portable terminal device through voice or other input devices;
(3) pressing a specific functional button; and
(4) performing a specific motion while holding the portable terminal device.

5. The system of claim 1, wherein the processor is further configured to determine a category of said sliding operation.

6. The system of claim 5, wherein the category of said sliding operation includes one or more of the following:

(1) numbers;
(2) letters;
(3) strokes;
(4) Chinese characters;
(5) handwritten characters of other languages;
(6) system predefined sliding-input; and
(7) user defined sliding-input.

7. The system of claim 6, wherein said handwritten characters of other languages include one or more of: Japanese characters, Korean characters, Thai characters, Arabic characters, Hebrew characters, and other minor language characters.

8. The system of claim 6, wherein the processor is further configured to determine a category of said sliding operation by using a Support Vector Machine method.

9. The system of claim 1, wherein to determine whether, the processor is further configured to analyze said sliding operation and compare it with the data related to sliding operation stored in the sliding-input database in order to obtain the category of said sliding operation, the processor is further configured to perform one or more of following processes:

analyzing said received sliding operation;
determine whether it is a single-stroke input or a multi-stroke input; and
processing said relative coordinates transferred by said original message based on the classification boundary method and comparing said sliding operation with the stored data related to sliding operation, in order to obtain the category of said sliding operation.

10. The system of claim 1, wherein said comparing includes a sliding-input classifier to remove the noise of a path, to output a noise-free path and to transform said noise-free path into spatial coordinates.

11. The system of claim 10, wherein said classifier uses Lagrange function to joint-optimize problems and constraints.

12. The system of claim 1, wherein said identifying includes matching the sliding operation with the pre-defined sliding patterns stored in said sliding-input database and taking one or more pre-defined sliding patterns matched as the sliding-identification results; and in the case of nothing matched, prompting user whether to set a new sliding operation.

13. The system of claim 1, wherein the processor is further configured to perform one or more of following processes before outputting sliding identification results:

calculating possibility weights corresponding to the possible matching sliding patterns according to predefined influence factors;
sorting the possibility weights; and
providing one or more possible sliding patterns in a sorted order for user to select, or automatically identifying the sliding-identification result with the largest possibility weight as the matching sliding pattern.

14. The system of claim 13, wherein said automatic identification is performed if a difference between the largest possibility weight and any other remaining possibility weights exceeds a predetermined weight difference threshold.

15. The system of claim 13, wherein the influence factors include a frequency of calling a contact and a similarity between said sliding operation and said possible matching sliding patterns.

16. The system of claim 1, wherein to output sliding identification results and trigger a follow-up corresponding operation, the processor is further configured to perform one or more of following processes:

appending the letter to a search query on the portable terminal device, and returning contact information including the letter, if the sliding-identification result is a letter; and appending the Chinese character or the handwritten character to a search query of the portable terminal device, and returning contact information including the Chinese characters or the handwritten character sequence, if the sliding-identification result is a Chinese character or a handwritten character.

17. The system of claim 1, wherein the processor is further configured to perform one or more of following processes so as to output said sliding-identification result and to trigger follow-up corresponding operations, when said sliding-identification result, which is a complex sliding-operation including several sliding operations of different categories, includes at least one first sliding operation including a letter or a stroke or a character or a hand-written character or the combination herein, and at least one second sliding operation including the predefined sliding-input:

identifying said first sliding operation, wherein corresponding letter or stroke or character or hand-written character or the combination herein is appended to the search sequence, and all the contact information including said first sliding operation is returned; and identifying said second sliding operation, and based on the sliding-identification result, performing follow-up triggered operations predetermined by the system or operations predetermined by the user on said returned contact information including said first sliding operation.

18. The system of claim 1, wherein the processor is further configured to perform a sliding-operation user-defined process with one or more of the following operations:

setting a user-defined sliding pattern; and setting a follow-up trigger operation corresponding to a user-defined sliding pattern.

19. The system of claim 18, wherein said sliding-operation user-defined process includes one or more of the following operations:

prompting the user to draw a sliding pattern on said contact list interface or said dial pad;

comparing the drawn sliding pattern with a set of sliding patterns stored in the sliding-input database;

displaying the similar sliding-patterns and prompting user to re-draw a sliding-pattern, if the similarity exceeds a threshold predetermined by the system; and otherwise, storing said drawn sliding-pattern.

20. The system of claim 18, wherein said follow-up triggered operations include one or more of the following operations:

making a call to a designated contact;

sending a text message to a designated contact;

sending an email to a designated contact;

sending an instant message to a designated contact via a network; and visiting the SNS homepage of a designated contact.

21. The system of claim 1, wherein said category of said original message includes one or more of the following types:

a static action, corresponding to a point on said touch screen; and a dynamic sliding-operation, corresponding to one or more sliding patterns on said touchscreen.

22. The system of claim 21, wherein said static action is one of the following actions: single-tapping, short-time pressing, and long-time pressing; and said dynamic sliding-operation is one of the following actions: sliding movement, multiple sliding movements, and multi-finger sliding movement.

23. The system of claim 1, wherein said data related to sliding operations includes predefined sliding input, user-defined sliding input, letters, numbers, strokes, and handwritten characters.

24. The system of claim 1, wherein said system further comprises a network storage device, and said network storage device establishes an interaction relationship between a network and said portable terminal based on a contact list, uploads and stores user-defined setting information of said sliding-operation and said data stored in said sliding-input database to a server.

25. The system of claim 24, wherein said network storage device is deployed in the network cloud.

26. The system of claim 2, wherein to determine whether said original message is a sliding operation, the processor is further configured to follow one or more of the following rules:

(a) a linear distance between a start point and an end point of the sliding pattern, according to said original message, exceeds a predetermined distance threshold;

(b) a length of the sliding pattern, according to said original message, exceeds a predetermined length threshold;

(c) a time duration for which a finger contacts the touch screen during said original message exceeds a predetermined time threshold; and (d) two or more touch points are pressed simultaneously in said original message.

27. A method for processing sliding operations on a portable terminal device, the portable terminal device comprising a touchscreen, the method comprising:

displaying a dial pad or a contact list interface on the touchscreen;

receiving an original message obtained on the dial pad or the contact list interface;

converting said original message to coordinates for processing;

selecting a slide-determining mode from a plurality of slide-determining modes based on properties of said original message, wherein selecting a slide-determining mode from a plurality of slide-determining modes is further based on a system state of the portable terminal device, wherein the portable terminal device further comprises a SIM card and wherein the system state of the portable terminal device includes a property of the SIM card;

determining whether said original message is a sliding operation based on the selected slide-determining mode, wherein the determining includes determining whether said original message is a sliding operation according to a category of said original message when the selected slide-determining mode is a direct sliding-input on a dial pad mode;

analyzing said sliding operation and comparing said sliding operation with data related to sliding patterns stored in a sliding-input database, when said original message is determined as a sliding operation;

identifying a result corresponding to said sliding operation according to the comparison;

outputting the result and trigger a follow-up corresponding operation;

appending, if the result is a number, the number to a dialing sequence of the portable terminal device; and appending, if the result is a stroke, the stroke to a search sequence of the portable terminal device, and returning contact information including the stroke sequence.

28. The method of claim 27, further comprising a sliding-operation user-defined process with one or more of the following operations:
  setting a user-defined sliding pattern; and
  setting a follow-up trigger operation corresponding to a user-defined sliding pattern.

29. The method of claim 27, wherein said follow-up triggered operations include one or more of the following operations:
  making a call to a designated contact;
  sending a text message to a designated contact;
  sending an email to a designated contact;
  sending an instant message to a designated contact via a network; and
  visiting the SNS homepage of a designated contact.

30. The method of claim 27, wherein determining whether said original message is a sliding operation in one or more of the following ways:
  determining said original message as a sliding operation in an independent sliding identification mode, if said original message is drawn in a drawing area between a predetermined operation for entering the independent sliding identification mode and before another predetermined operation for exiting the independent sliding identification mode; and
  determining said original message in a special starting area identification mode, from touching the screen to lifting from the screen, as a sliding operation, if the user's action starts from a designated area.

31. The method of claim 27, further comprising one or more of the following processes before outputting sliding identification results:
  calculating possibility weights corresponding to the possible matching sliding patterns according to predefined influence factors;
  sorting the possibility weights; and
  providing one or more possible sliding patterns in a sorted order for user to select, or automatically identifying the sliding-identification result with the largest possibility weight as the matching sliding pattern.

32. The method of claim 31, wherein said automatic identification is performed if a difference between the largest possibility weight and any other remaining possibility weights exceeds a predetermined weight difference threshold.

33. The method of claim 27, wherein said identifying includes matching the sliding operation with the pre-defined sliding patterns stored in said sliding-input database and taking one or more pre-defined sliding patterns matched as the sliding-identification results; and in the case of nothing matched, prompting user whether to set a new sliding operation.

34. A system for processing sliding operations on a portable terminal device, the portable terminal device comprising a touchscreen, the system comprising:
  a memory device configured to store data related to sliding operations; and
  a processor coupled to the memory device, the processor being configured to:
    cause to display a dial pad or a contact list interface on the touchscreen;
    receive an original message obtained on the dial pad or the contact list interface;
    convert said original message to coordinates for processing,
    select a slide-determining mode from a plurality of slide-determining modes based on properties of said original message, wherein to select a slide-determining mode from a plurality of slide-determining modes is further based on a system state of the portable terminal device, wherein the portable terminal device further comprises a SIM card and wherein the system state of the portable terminal device includes a property of the SIM card;
    determine whether said original message is a sliding operation, when said original message intersects with a boundary line between two keys on the dial pad, or appears in two key areas at one time, or the sliding pattern covers at least two key areas;
    analyze said sliding operation and compare said sliding operation with the data related to sliding patterns stored in a sliding-input database, when said original message is determined as a sliding operation;
    identify a result corresponding to said sliding operation according to the comparison;
    output the result and trigger a follow-up corresponding operation;
    append, if the result is a number, the number to a dialing sequence of the portable terminal device; and
    append, if the result is a stroke, the stroke to a search sequence of the portable terminal device, and returning contact information including the stroke sequence.

35. The system of claim 34, wherein the first predetermined operation is one or more of following operations:
  (1) tapping a button on the touch screen;
  (2) sending a voice command to said portable terminal device;
  (3) shaking said portable terminal device;
  (4) pressing a hardware button of said portable terminal device;
  (5) sending an instruction to the portable terminal device through other input devices; and
  (6) drawing a sliding-pattern with a specific shape, and wherein the second predetermined operation is one or more of following operations:
  (1) tapping an exit button;
  (2) inputting an exit order to the portable terminal device through voice or other input devices;
  (3) pressing a specific functional button; and
  (4) performing a specific motion while holding the portable terminal device.

36. The system of claim 34, wherein the processor is further configured to perform following processes so as to output said sliding-identification result and to trigger follow-up corresponding operations, when said sliding-identification result, which is a complex sliding-operation including several sliding operations of different categories, includes at least one first sliding operation including a letter or a stroke or a character or a hand-written character or the combination herein, and at least one second sliding operation including the predefined sliding-input:
  identifying said first sliding operation, wherein corresponding letter or stroke or character or hand-written character or the combination herein is appended to the search sequence, and all the contact information including said first sliding operation is returned; and
  identifying said second sliding operation, and based on the sliding-identification result, performing follow-up triggered operations predetermined by the system or operations predetermined by the user on said returned contact information including said first sliding operation.

37. The system of claim 34, wherein said category of said original message includes one or more of the following types:
- a static action, corresponding to a point on said touch screen, wherein said static action is one of the following actions:
  single-tapping,
  short-time pressing, and
  long-time pressing;
- a dynamic sliding-operation, corresponding to one or more sliding patterns on said touchscreen, wherein said dynamic sliding-operation is one of the following actions:
  sliding movement,
  multiple sliding movements, and
  multi-finger sliding movement.

* * * * *